US007546255B2

(12) United States Patent
Cruz et al.

(10) Patent No.: US 7,546,255 B2
(45) Date of Patent: Jun. 9, 2009

(54) INVENTORY SYSTEM

(75) Inventors: Carlos Fernando Bella Cruz, Sao Paulo (BR); Carlos Benjamin de Silva, Irving, TX (US); Pedro Sergio de Souza, Marietta, GA (US); Luiz Gustavo Solia, Irving, TX (US)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 10/665,232

(22) Filed: Sep. 17, 2003

(65) Prior Publication Data

US 2004/0059650 A1     Mar. 25, 2004

Related U.S. Application Data

(63) Continuation of application No. 09/540,066, filed on Mar. 31, 2000, now abandoned.

(51) Int. Cl.
*G06Q 30/00*     (2006.01)
(52) U.S. Cl. .............................. 705/28; 705/26; 705/30
(58) Field of Classification Search .................. 705/30, 705/26, 28
See application file for complete search history.

(56) References Cited

U.S. PATENT DOCUMENTS

| 4,459,663 | A | * | 7/1984 | Dye ............................. 705/29 |
| 4,924,386 | A | * | 5/1990 | Freedman et al. .............. 705/8 |
| 5,148,370 | A | | 9/1992 | Litt et al. |
| 5,216,593 | A | * | 6/1993 | Dietrich et al. ............. 345/467 |
| 5,231,567 | A | | 7/1993 | Matoba et al. |
| 5,237,495 | A | | 8/1993 | Morii |
| 5,251,290 | A | * | 10/1993 | Pabon ......................... 345/420 |
| 5,255,181 | A | | 10/1993 | Chapman et al. |

(Continued)

FOREIGN PATENT DOCUMENTS

| JP | 403025668 A | * | 2/1991 |
| JP | 406028369 A | * | 2/1994 |
| JP | 02000040110 A | * | 2/2000 |

OTHER PUBLICATIONS

ECECS 543 Lecture Notes, "Matching", http://cheng.ececs.uc.edu/cs543/5/22.html, May 22, 1997.*
Simon, Istvan; CS4245 Analysis of Algorithms, Bipartite Matching; http://www.mcs.csuhayward.edu/~simon/handouts/4245/hall.html.*
Salman, F., Kalagnanam, Jayant, Murthy, Sesh; IBM Research Report Cooperative Strategies for Solving the Bicriteria Sparse Multiple Knapsack Problem; RC 21059; Nov. 17, 1997.*

(Continued)

*Primary Examiner*—Matthew S. Gart
*Assistant Examiner*—Garcia Ade
(74) *Attorney, Agent, or Firm*—Scully, Scott, Murphy & Presser, P.C.; William E. Schiesser

(57) ABSTRACT

A method and system that provides the functions to search for material that would fit an order or search for order that a piece of material would fit. For that, the system considers the technical specification defined in the processing route assigned to the orders, domain-expert knowledge for check for feasible matches, and a flexible plant model to specify valid feasible stock areas for searching. This system allows complete visibility of all material in a plant and its suitability to be applied to the customer orders. A second aspect of this invention is a material re-allocation method and system. In accordance with this system, each coil to be processed by the finishing area receives a surface defect map. This map indicates the location of the defects and their characteristics.

12 Claims, 16 Drawing Sheets

Inventory Application System

U.S. PATENT DOCUMENTS

| | | | |
|---|---|---|---|
| 5,280,425 A | | 1/1994 | Hogge |
| 5,291,394 A | | 3/1994 | Chapman |
| 5,630,070 A | | 5/1997 | Dietrich et al. |
| 5,630,123 A | * | 5/1997 | Hogge ............................ 707/7 |
| 5,734,592 A | * | 3/1998 | Cox et al. .................... 702/179 |
| 5,737,728 A | * | 4/1998 | Sisley et al. .................... 705/8 |
| 5,841,958 A | * | 11/1998 | Buss et al. ................... 345/440 |
| 5,943,652 A | | 8/1999 | Sisley et al. |
| 5,946,663 A | | 8/1999 | Tanaka et al. |
| 5,983,195 A | * | 11/1999 | Fierro .......................... 705/10 |
| 6,044,361 A | * | 3/2000 | Kalagnanam et al. ......... 705/28 |
| 6,049,774 A | | 4/2000 | Roy |
| 6,105,018 A | * | 8/2000 | Demers et al. .................. 707/2 |
| 6,122,560 A | | 9/2000 | Tsukishima et al. |
| 6,341,266 B1 | * | 1/2002 | Braun ............................ 705/7 |
| 6,678,947 B1 | * | 1/2004 | Bauer et al. .................... 29/832 |
| 6,952,682 B1 | * | 10/2005 | Wellman ...................... 705/37 |

OTHER PUBLICATIONS

Kalagnanam, Jayant, Dawande, Milind, Trumbo, Mark, Lee, Ho; IBM Research Report Inventory Matching Problems in the Steel Industry; RC 21171; May 4, 1998.*

Production, Planning and Scheduling (ACESITA), Jun. 1996.*

Lee, H.S., et al., (1996), "Primary production scheduling at steelmaking industries," *IBM J. Res. Develop.*, vol. 40, No. 2.

Production Planning and Scheduling, Functional Architecture, Itabira Special Steels Co., Acesita, IBM Applied Manufacturing Technologies, Atlanta, USA/Brazil, Jun. 1996.

* cited by examiner

Inventory Application System

INVENTORY SYSTEM

This application is a continuation of application Ser. No. 09/540,066, filed Mar. 31, 2000 now abandoned.

BACKGROUND OF THE INVENTION

This invention generally relates to inventory systems. More specifically, the invention relates to methods and systems for matching inventory—both raw materials and finished goods—to orders.

Inventory management in a manufacturing plant, such as a seel mill, is very important, and also just as difficult. During production process, there are several reasons that lead to increase inventory levels at a plant. Customers can cancel an order already in process or even finished. Efficient lot sizes do not match perfectly to the exactly amount of material needed to fulfill customers orders. Material deviates from original specification and is unassigned from customer order. Material bought from third part producer sits and wait for assignment to customer orders. No matter the reason, having material sitting unassigned in inventories holds the cash flow and, therefore, companies try to minimize such material.

In addition, early during a planning cycle for a steel mill, available material is applied to the orders if certain properties of the orders and of the available material match. At that time, however, material surface defects are not considered. Right before the finishing scheduling process begins, additional information becomes available about the quality of the material. It is possible that because of deviations from the planned quality, certain material may not be deliverable to the client. If these quality deviations invalidate the delivery, then it becomes necessary to search for other coils that may already be assigned to other order to meet customer requests. This may require swapping coils to find the best match between available coils and the orders requiring them.

SUMMARY OF THE INVENTION

An object of this invention is to provide an improved inventory application system.

Another object of the present invention is to search efficiently for material that would fit an order, or for an order that a piece of material would fit.

A further object of this invention is to improve material re-allocation systems.

Still another object of the present invention is to provide a material re-allocation system that searches for the best match between available material and orders to assign the materials.

A first aspect of the present invention is a method and system that provides the functions to search for material that would fit an order or search for order that a piece of material would fit. For that, the system considers the technical specification defined in the processing route assigned to the orders, domain-expert knowledge for check for feasible matches, and a flexible plant model to specify valid feasible stock areas for searching. This system allows complete visibility of all material in a plant and its suitability to be applied to the customer orders.

A second aspect of this invention is a material re-allocation method and system. In accordance with this system, each coil to be processed by the finishing area receives a surface defect map. This map indicates the location of the defects and their characteristics. The actual dimensions of the coil are also registered. The Material Reallocation application reallocates the coils automatically to satisfy the customer requirements using the information of the defect map and the description of the quality restrictions demanded by the customer. All the allocations are made respecting the restrictions of the requests and the validity of the resulting shearing and slitting required. In addition to the reallocation process, this application also defines the sequence in which these cuts need to be made on the various pieces of equipment.

This application allows manual interventions through a GUI. Its interface indicates violations of any restrictions and allows the user to decide whether or not the process of reallocation should continue.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
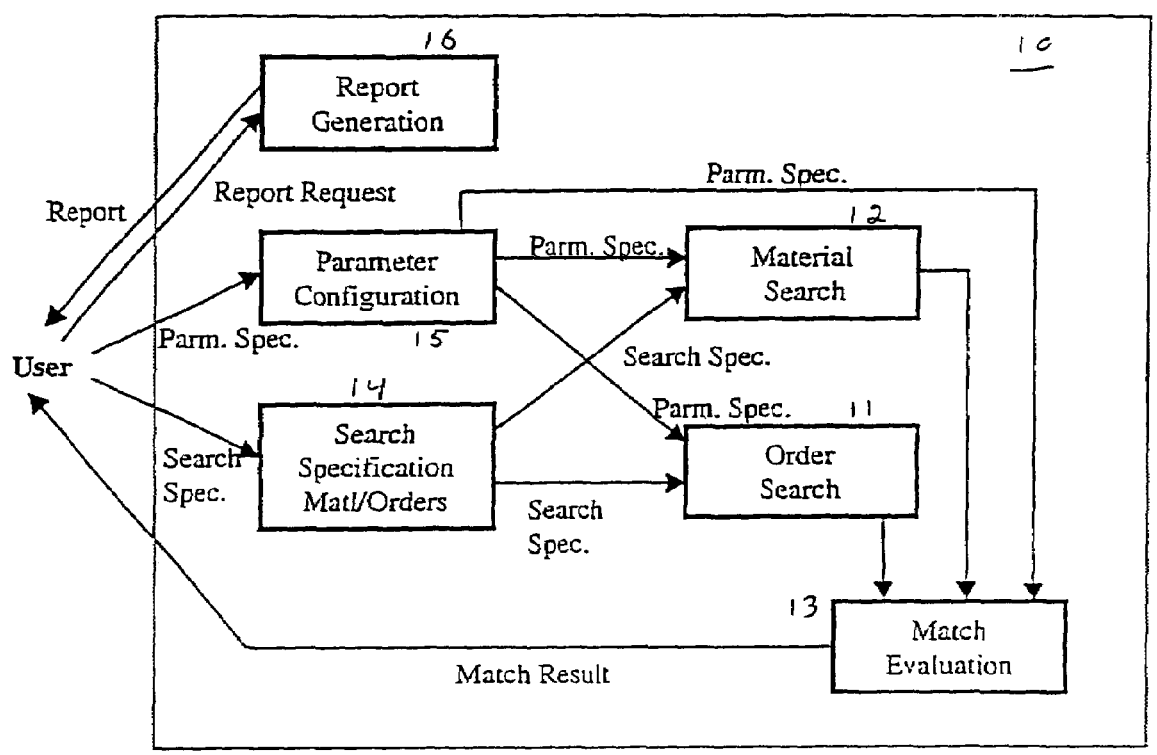
FIG. 1 shows a functional architecture for an inventory application system embodying the present invention.
Figure 2:
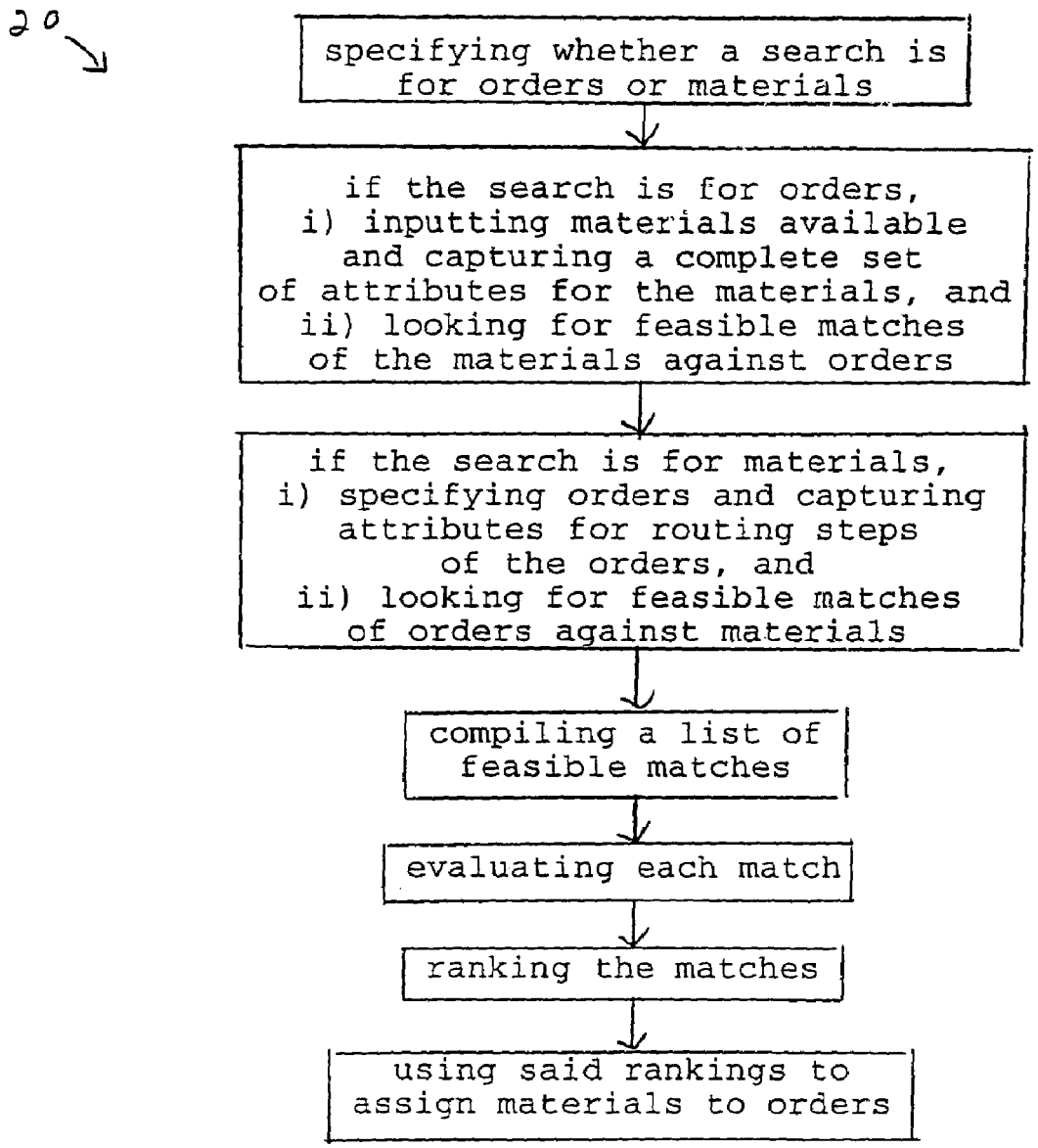
FIG. 2 is a flow chart illustrating a method of operating the system of FIG. 1.

FIG. 1 illustrates a functional architecture 10 embodying a first aspect of this invention, and FIG. 2 shows a flowchart 20 for performing a method for operating this architecture. Preferably, as indicated in FIG. 1, the inventory application module 10 has the following major functions: Order Search 11, Material Search 12, Match Evaluation 13, Search Specification for Material/Order 14, Parameter Configuration 15, and Report Generation 16.

The Order Search function searches through orders to assign inventory, More specifically, given a piece of material, this function searches through a set of open orders and find those to which the unassigned inventory can be legally assigned to. The search uses the information from the routing system and considers the conditions that the material should have at all the stages of production. For every match there is an evaluation about how well the material fits the order specification. The feasible matches are displayed in an ordered list with the best match listed first. The user has the ultimate decision on the order to which the piece of material should be assigned. Among all the available orders, the user is able to apply filters and selections to restrict the search. For example, searching only through the incomplete orders or searching through only orders of a specific client. The user also has the option of automating the order selection and removing the need for manual review.

The material search function searches through materials to assign materials to orders. Given an order, this function is able to search through all unassigned material and find the pieces that can be assigned to an order, this function is able to search through all unassigned material and find the pieces that can be assigned to an order. All matches between the pieces of material and the order are evaluated and listed in order, starting with the best match. Here too, the routing system is used to provide information about intermediate stages of production. Several filters, to restrict the material search and to make the data handling easy, is provided. The user also has the option of automating the order selection and removing the need for manual review. The match evaluation function checks for the value of each attribute of the material and compare it against the best value the material should have for an ideal match to that order. Based on this information it returns a value to reflect the goodness of the match with respect to that attribute. After completing this process for all the attributes, it calculates a single value that reflects the overall quality of the match. This value is used to rank the matches.

The search specification for material/order function is used to define various conditions. Before starting a search, the user decides whether the search is for material order, the filters to apply to the orders or material and points of stock to check. At this stage, the user defines all the conditions for the system to perform the search.

The parameter configuration function offers the user the ability to change a large set of parameters that will allow a precise adjustment of the type of search he/she wishes to perform and an indication of the stock areas to be searched. It also assigns the weights to the matches of the various attributes.

The report generation function is used to generate reports. Preferably, at any time, the user will be able to generate several types of reports such as the amount of a particular material available in stock, incomplete orders, available prime material, etc.

To run the system, the user specifies the type of search he/she wants to perform order or material. For the order search, he/she inputs or selects from the database the type of material available so that the system can capture a complete set of attributes to look for a match against the feasible orders. Every routing step for each order is checked. On the other hand, for a material search, he/she specifies an order so that the system can capture all attributes for each intermediate routing step. Again, the availability of the material at every intermediate step of the order route is checked. After the list of feasible matches is complete, each match is evaluated and ranked according to the weighted parameters defined by the user. The system evaluates the matches and ranks them. Finally, the user can choose a specific match from the list and the system will actually assign the material to the order. The user is also able to skip this step and the system automatically assigns the best match.

To perform material or order search, the proposed system makes use of rules regarding the attributes of the order and the material to be considered during a match. Most of the time, an order will accept a range of values for a given attribute. The value for that specific attribute should be in the range allowed by the order to be considered as valid. If all the attributes are considered valid, then the piece of material being checked is feasible to be assigned to a given order.

The system is composed by a graphical user interface with several screens under Windows/95 where the user can define the plant model and the search configuration, visualize the feasible assignments and observe several characteristics about the orders and the material being presented on the GUI. The GUI communicate with a server running the search algorithms under the UNIX operating system through the data base (Oracle) as well as with several other system.

Figure 3:
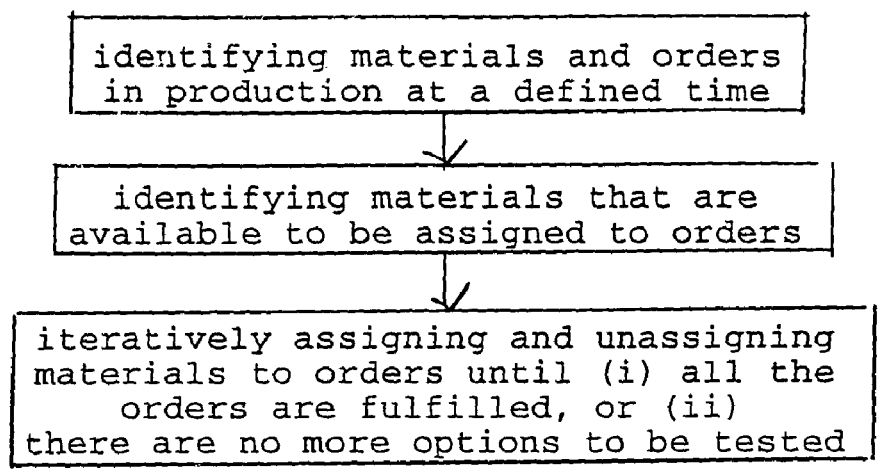
FIG. 3 is a flow chart showing the operation of a preferred material re allocation system embodying the present invention.

A second aspect of the invention provides a method and system for efficiently assigning finished goods with received customer orders. With reference to FIG. 3, which is a flowchart 30 for performing this method, this system considers at once all the metallic units (i.e., slabs, hot coils, cold coil, blankets) and all the orders in production at a given moment. It identifies what are the valid coils that can be assigned to each order. Then it look for the largest feasible area in each metallic unit that can be assigned to a complete order or a piece of it. For this, the system considers the list of defects that the order (client) agrees to accept on the surface of the material. Then, considering the delivery date and trying to minimize waste of material, the system iterates in a loop that assign and unassign material to orders until all the orders are fulfilled or there are no more options to be tested. The global assignment that minimize tardiness and waste is selected.

The algorithm starts checking what are the valid possible assignments between each order and every metallic unit. Then, it builds a bi-partite graph, where each node is either an order or a metallic unit. An edge between a metallic unit and an order means that such metallic unit can be assigned to that order. Then, it updates the defect maps (a representation of the metallic unit with the physical position of all its defects) and searches for largest valid area (an area having either no defects or only the ones that are acceptable to an order) for every order. If there is no area of minimum size (specified in the order) available, the edge between that order and that metallic unit is deleted. Otherwise, it is kept.

The algorithm always takes the last solution created as an initial graph. Then, it validates the old edges and inserts the new ones. If the previous solution satisfies all the orders for the current execution, the algorithm stops and the new solution is the same as the old one. Otherwise, it identifies what are the incomplete orders and, starting with the orders with the earliest due dates, the algorithm searches among the valid metallic units for that order and assigns valid areas to the order until the order is complete. For every assignment, it checks if it is feasible to cut the metallic unit, given the machinery available, and if the yield obtained in the cut process is also acceptable. if every check is valid, the area is assigned to the order and a new area or metallic unit is picked up for analysis till the order is complete. If any check is not valid, the metallic unit is abandoned and a new one is taken. If there is no more metallic unit available and the order is not completed yet, a new pass among the valid metallic units occurs with the difference that now the other orders already in the metallic units are removed. If the new situation minimizes the waste of material, then the change is accepted. Removed orders go back to the graph to be fulfilled. Orders cannot be removed more than k (parameter) times. the algorithm goes on till all the orders are fulfilled or there are no more available metallic units.

The system consists of a graphical user interface with several screens, an algorithmic kernel, physical data model, and interface with Inventory Application System, Scheduling System and Detailed Planning System.

Various systems used in the present invention are described below.

Figure 4:
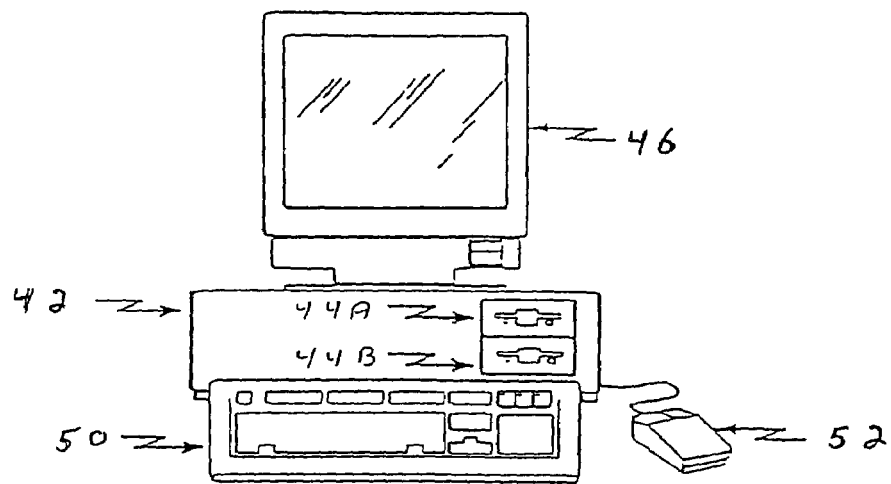
FIGS. 4 and 5 show a computer system that may be used in the invention.

As will be understood by those of ordinary skill in the art, the present invention may be carried out on any suitable computer or computer network. FIG. 4 illustrates, as an example, a computer of a type that may be used in the practice of this invention. Viewed externally in FIG. 5, a computer system has a central processing unit 42 having disk drives 44A and 44B. Disk drive indications 44A and 44B are merely symbolic of a number of disk drives that might be accommodated by the computer system. Typically, these would include a floppy disk drive such as 44A, a hard disk drive (not shown externally) and a CD ROM drive indicated by slot 44B. The number and type of drives vary, usually, with different computer configurations. The computer has the display 46 upon which information is displayed. A keyboard 50 and a mouse 52 are normally also available as input devices.

Figure 5:
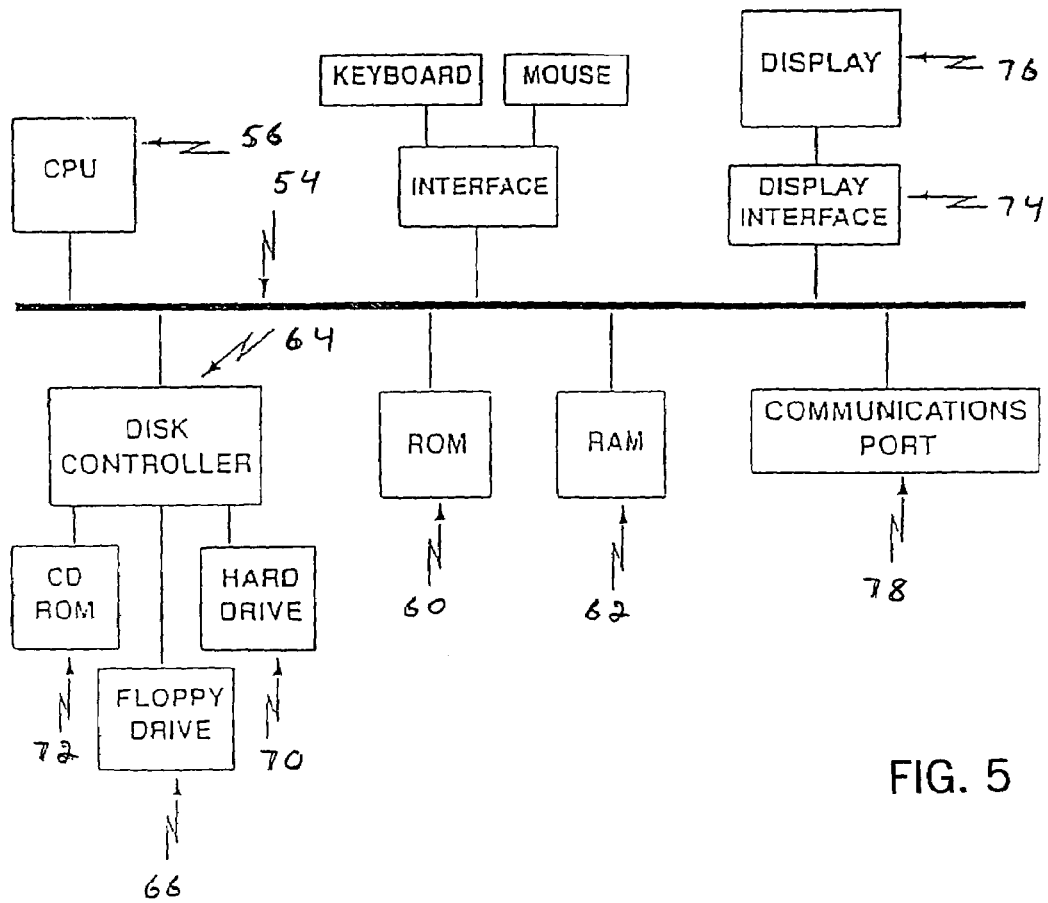

FIG. 5 shows a block diagram of the internal hardware of the computer of FIG. 4. A bus 54 serves as the main information highway, interconnecting the other components of the computer. CPU 56 is the central processing unit of the system, performing calculations and logic operations required to execute programs. Read only memory 60 and random access memory 62 constitute the main memory of the computer. Disk controller 64 interfaces one or more disk drives to the system bus 54. These disk drives may be floppy disk drives, such as 66, internal or external hard drives, such as 70, or CD ROM or DVD (Digital Video Disks) drives, such as 72. A display interface 74 interfaces a display 76 and permits information from the bus to be viewed on the display. Communications with external devices can occur over communications port 78.

Figure 6:
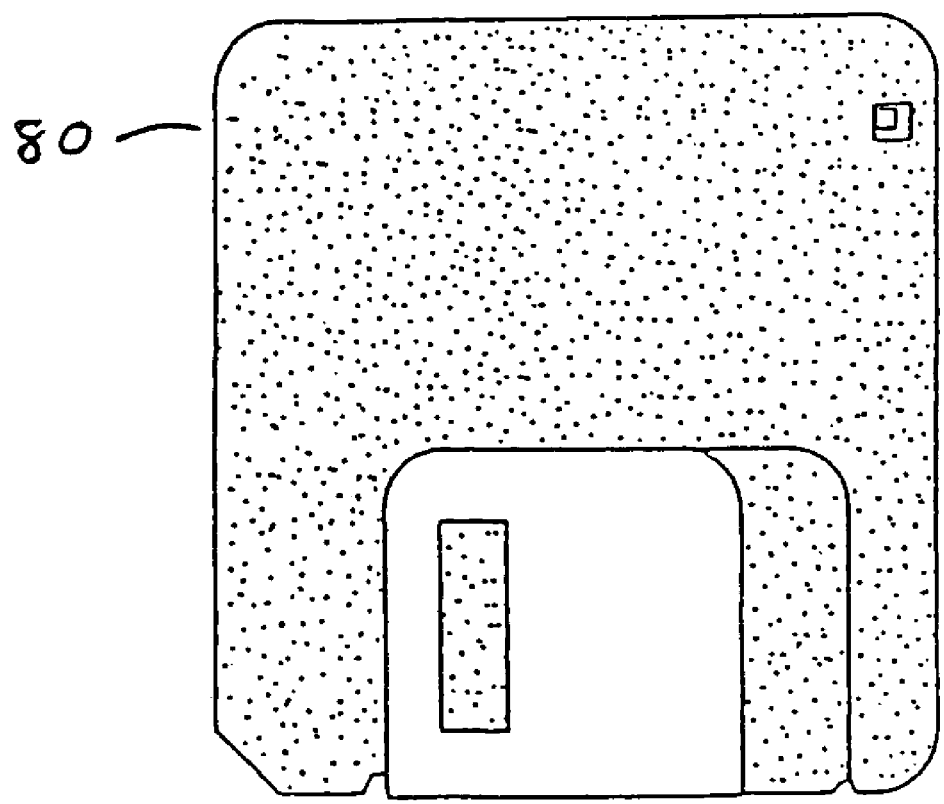
FIG. 6 illustrates a memory medium that can be used to hold a computer program for carrying out this invention.

FIG. 6 shows a memory medium 80 that may be used to hold a computer program for implementing the present invention, and this medium may be used in any suitable way with any appropriate computer to carry out the invention. Typically, memory media such as a floppy disk, or a CD ROM, or a Digital Video Disk will contain the program information for controlling the computer to enable the computer to perform its functions in accordance with the invention.

Proposed Functional Architecture

Figure 7:
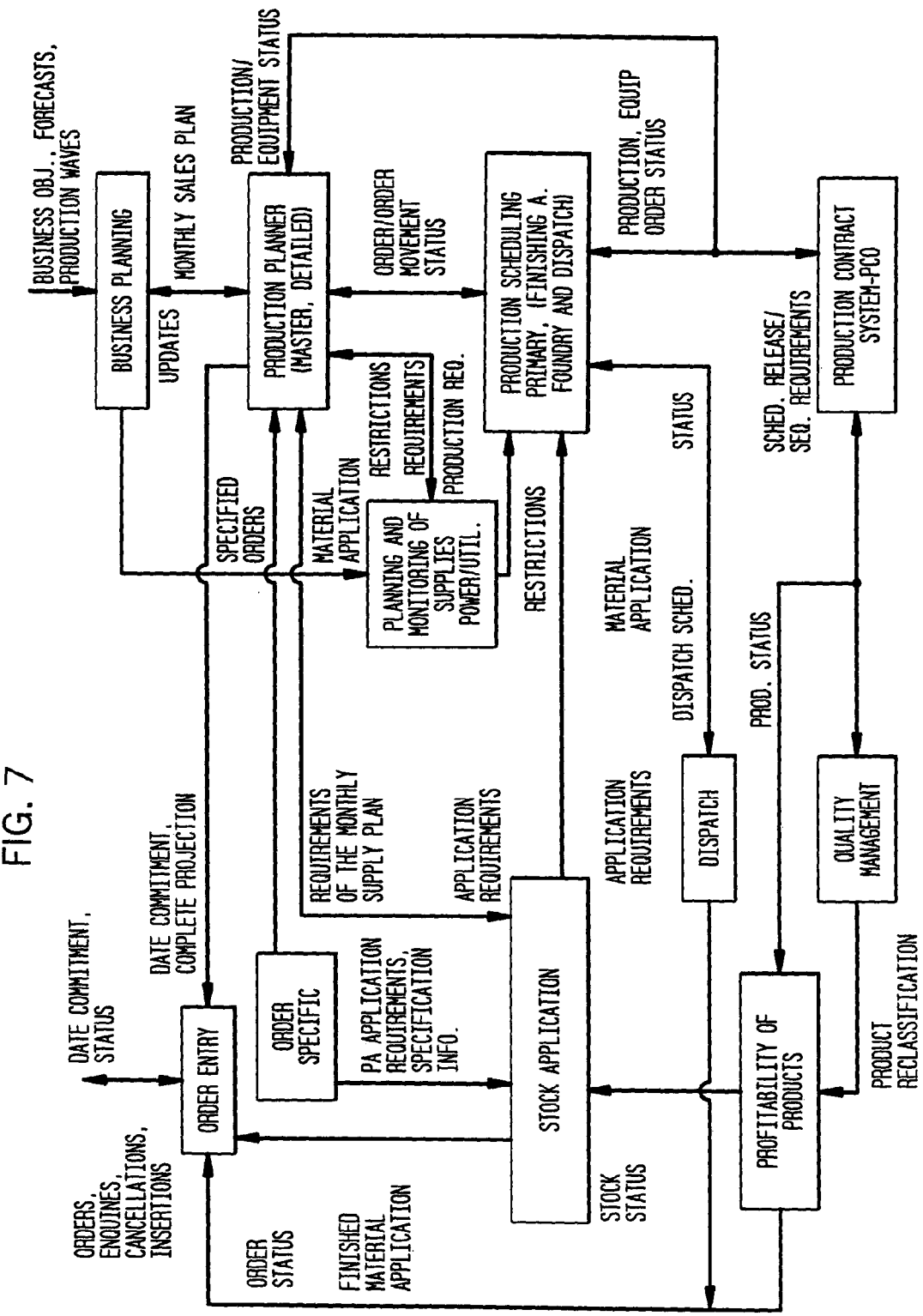
FIG. 7 shows a functional architecture that may be used with the method and system described herein.

FIG. 7 shows a functional architecture that may be used with the method and system disclosed herein. The basic object of a functional architecture is to establish a set of logical procedures that reflect the operational behavior of an organization. The architecture of FIG. 7 covers functional needs and offers some innovations in the operating procedures currently in use. Among these innovations, the number of production planning and scheduling layers is reduced, whilst nevertheless increasing the level of detail of the activities to be carried out. Another significant innovatory aspect is the application of the open book concept for entering orders. Under this concept, as the orders are placed, they are allocated one by one to the plant's resources. This means that planning can handle the plant's capacity sufficiently precisely to be able to set a reliable and speedy delivery date for an order, whilst nevertheless retaining flexibility of scheduling in order to best adapt the production sequence to inevitable unforeseen events. FIG. 7 shows the functional architecture. The remainder of this text will explain in detail the other characteristics and concepts supporting the raison d'être of this architecture.

The principal modules of the proposed architecture are

Once a year, or whenever necessary, the production capacity of the plant is compared with the market conditions and an optimum proportion of how much is to be produced of each product is determined. The main events which will occur in the plant, such as long periods of maintenance, are considered and handled so as to reduce their effects on the company's profit.

Master Planner

This module keeps a check on the production availability of each type of product starting from a certain horizon (generally 3 months). This availability is used to supply the order delivery date. The optimum product mix generated by the Year Plan is updated and used as a basic datum by the Master Plan, which converts it from monthly periods to production weeks through the generation of production campaigns. Accordingly, the Master Planner can ensure that delivery date commitments are made aggressively, but viably.

Detailed Planner

For orders placed a short time before the delivery date (generally less than three months), a meticulous analysis is made of the availability of the plant and inventory with the Detailed Planner module. Daily production capacities are considered.

Primary and Finishing Area Scheduling

Orders must be selected and scheduled so as to meet commitments to customers and to effectively benefit from the plant's equipment. Grouping and sequencing constraints, configuration times and inter-dependence of equipment must be taken into consideration for loading the plant in the best possible way. As the production conditions change, the plant's scheduling must be adjusted to meet the new context and constraints.

Dispatch Area Scheduling

Shipping completes the processing stages of an order. The dispatch of orders must continue the process of optimization in the planning and scheduling undergone by the order, to minimize any delay in delivery and effectively explore transport alternatives. The integration of Shipping with Production Scheduling is achieved through the ability to view the material to be produced by the plant and by considering the load restrictions for dispatch.

Technical Specification and Routing of Orders

As the orders arrive, they must be specified technically and added to the database from which production planning and scheduling extract the information relevant to them. The nomenclature and terminology specific to the user and its standard products must be supported by this module.

Inventory Application

This module matches up the material available in the plant with the orders to be produced. The material may be plates, partially processed coils or finished products. Business rules are used to judge the quality of the match, for defining which order will be used when more than one fits the material and for selecting which material will be allocated to an order when more than one material may be applied. An analysis of the impact on plant capacity becomes necessary for each allocation.

Characteristics of the Proposed Functional Architecture

All the modules, such as Technical Specification and Routing of Orders, Planning, Production Scheduling and Inventory Application are fully integrated.

Both the "production for orders" and "production for stock" strategies can be supported.

All the modules are highly flexible owing to the broad parameter settings of the data they use.

Constraints and requests that benefit customer satisfaction and the maximum productivity of the plant are also considered.

Figure 8:
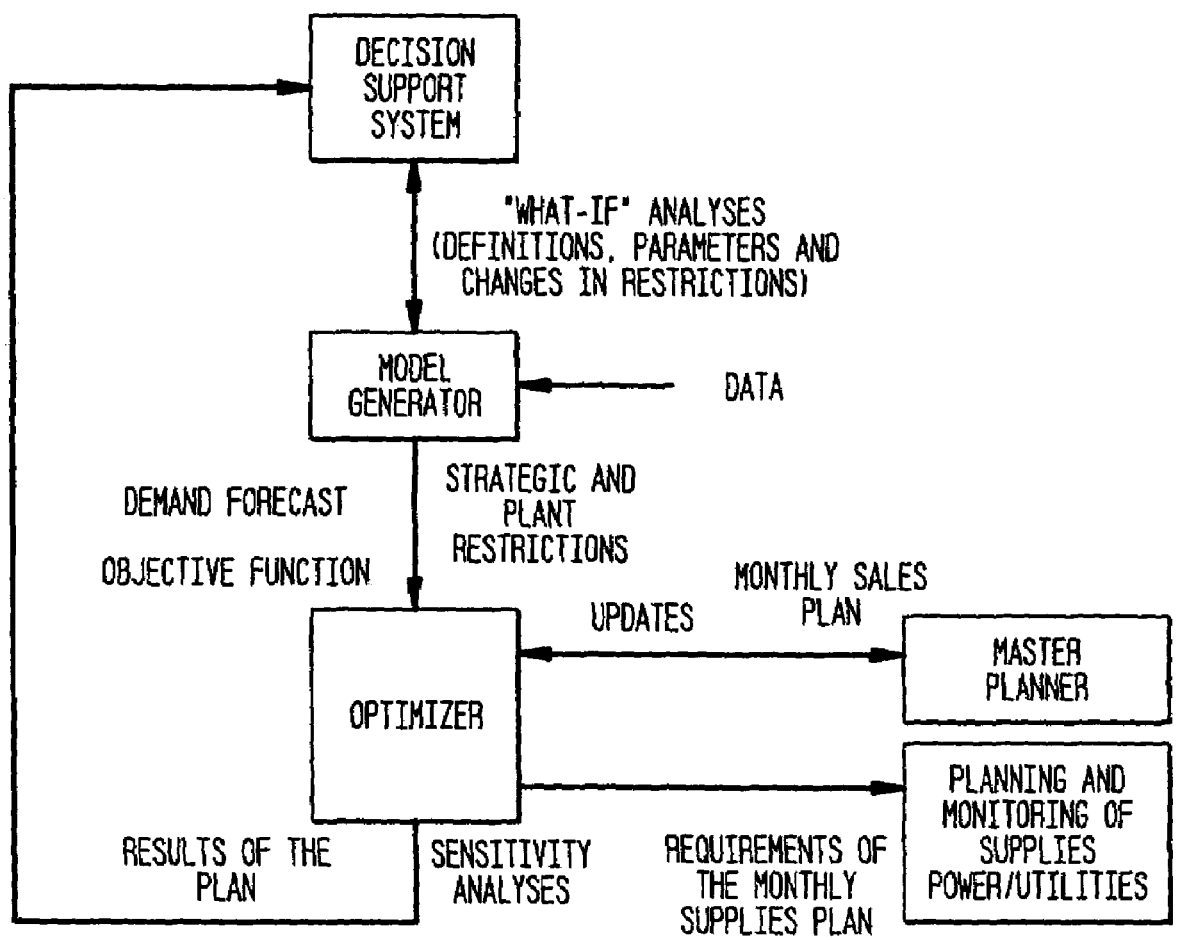
FIG. 8 shows the functional architecture of the Year Planner.

Uses advanced techniques of Combinatorial Optimization and Artificial Intelligence, as well as algorithms specially designed for iron and steel industry problems Year Planner The main objectives of the Year Planner, shown in FIG. 8, are:

to identify the optimum mix of products to be produced for a certain time horizon, given a market context and constraints to be met.

to analyze the impact of critical aspects, such as market segmentation, commitment of production between products and prioritization in serving customers.

creating a guide for the sales department with a view to the best product mix for the company for the period in question.

Detailed by each type of product that the plant can produce, an objective function is defined such that it can express the overall profitability of the plant for any product mix. The best product mix is that which maximizes this objective function, meeting all the constraints imposed. This type of problem is generally resolved by Linear Programming models. The tool to be adopted for implementing the model must provide, in addition to the solution, a sensitivity analysis of the constraints, identifying those that have the most impact on maximizing the objective function.

The plan generated by this module is reviewed and, via a Decision Support System interface, the impact of various scenarios on the objective function used can be tested. The final plan is published and stored for use as an initial platform for the lowest levels of planning.

FIG. 8 shows the functional architecture for the Year Planner.

Model Generator

This module is responsible for generating a suitable representation of the mathematical model defined by the user in the optimization module. The model consists of the objective function, which generally reflects the company's profit margin and the constraints to be imposed. The constraints usually consist of limits on the anticipated demand for products, capacity of the plant's machines and the relationship between processes. For the purpose of the Year Planner, the capacity of the machines may be just the number of hours that each of them is available for operation in a certain period of time.

Optimizer

This module generates the value of the objective function for the best alternative of all the possibilities, i.e. it generates the optimum solution. It also generates a sensitivity analysis enabling the identification of which variables, parameters and constraints are causing greater impact on the objective function.

Decision Support System

Via this system, the user interacts with the model, alters the parameters and constraints and observes the result and the impact of the changes. This module ensures that the user will have the means of imposing his decisions on any automatically generated solution.

Figure 9:
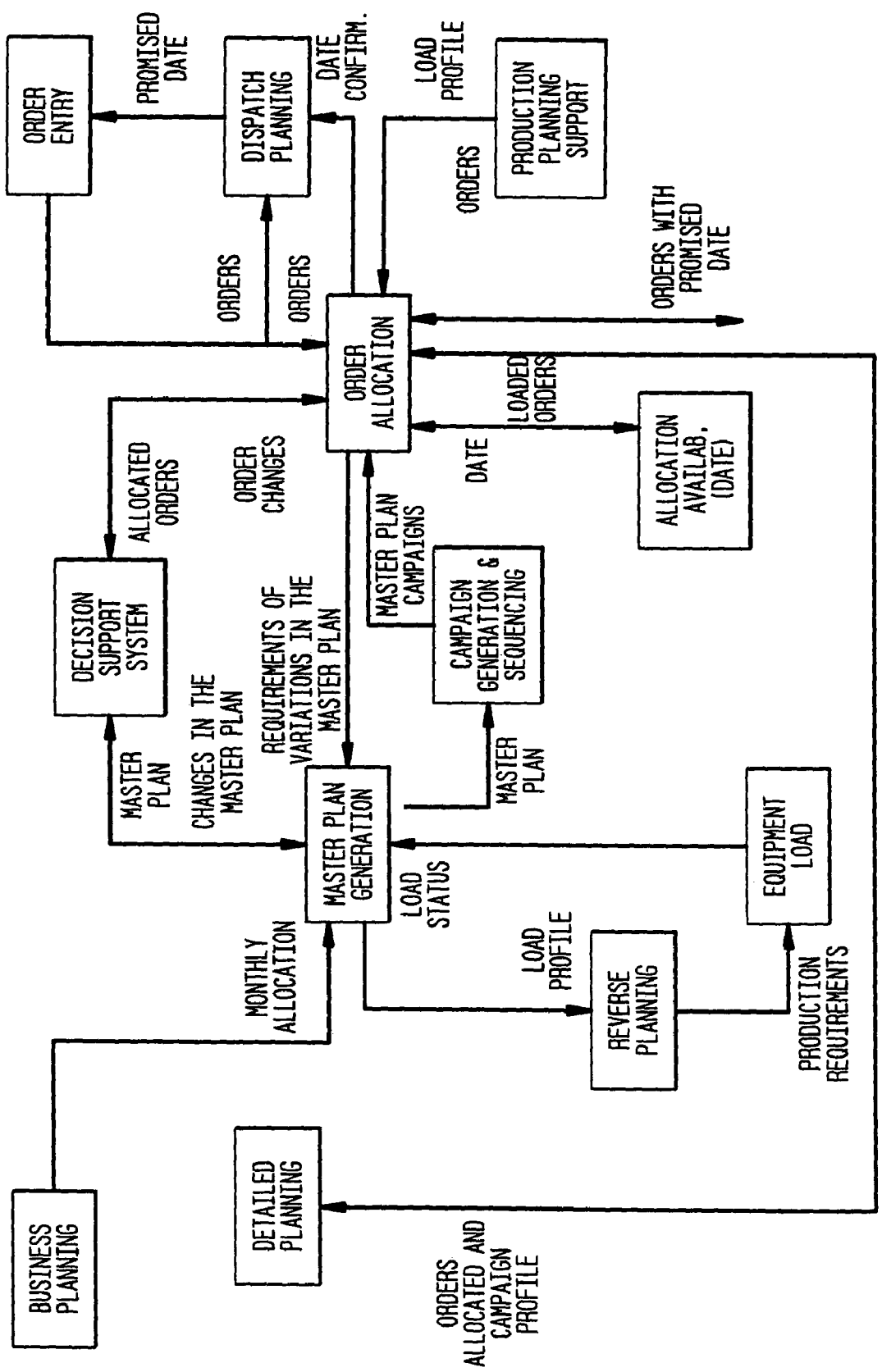
FIG. 9 shows the functional architecture of the Master Planner of FIG. 8.

The main objectives of the Master Planner, shown in FIG. 9, are:

1. To review the year planner assumptions and projections for the next few months and then confirm them or modify them.
2. To generate suitable campaign sequences for each month of production.
3. To analyze the following months in detail and generate a production plan for the plant to be used in undertaking the date for orders to be placed.
4. To allocate the orders to plant machines and generate viable delivery dates.
5. To generate information for the Planning of Supplies.

The Master Planner allocates the optimum quantities of products supplied by the Year Plan to lesser periods, generally of one week or ten days in duration. Accordingly, it must create the production campaign periods for the various types of products on the various plant equipment. The operating horizon of the Master Planner is usually three to six months from the current date, i.e. the horizon is dynamically adjusted each month. This means that each month's production capacities can be revised as long as the month is within the operating horizon.

New orders that fall within the operating horizon of the Master Planner are allocated against the plant's weekly production capacities so that the order delivery date may be determined. The accounting of the remaining capacity is kept continually up to date to be used on the arrival of the next order. For orders exceeding one week's production capacity, the Master Planner performs a running total calculation of the weekly capacities prior to the date wanted by the customer and allocates the order to the number of weeks that are needed. If, even so, there is not sufficient capacity for producing the order, it is not accepted. The earliest date that the order can be produced is notified. In the event of any cancellation of orders, the plant's available capacities are updated. FIG. 9 shows the functional architecture for the Master Planner.

Generation of the Master Plan

The allocation of capacity to the machines specified by the Year Plan is converted into weekly allocations, which form the basis of all the planning of the Master and Detailed Planner. The master plans for each product family are generated from non-detailed constraints of machine capacity and forecasts of customer demands which may be introduced directly into the Master Planner or via the data originating from the Year Plan. Each generated plan supplies a capacity for each product family which can be feasibly produced by the plant.

Since changes and unexpected events are inevitable, the plans can be revised automatically, given the conditions for which the replanning is performed, or manually, via the Decision Support System.

Campaign Generator

Once the Year Planner supplies the ideal product mix for the next few months, this module analyses this mix and generates a sequence of production campaigns that the various plant equipment must follow in order to produce these products in an optimized manner. The generation and sequencing of these campaigns must be in accordance with the plant's processing constraints and with the rules of business.

Allocation of Orders

When the orders are placed, they are assigned to periods of time, generally weeks, in which the master plans are created. Their delivery dates are determined and undertaken with the customer. If there is not sufficient capacity for producing in good time for the customer, the reason for this being impossible will be notified.

Reverse Planning

Starting from the requested delivery date, each stage of production in the route of a product is examined and the consumption of capacity and execution time are reflected in the Master Planner weekly periods.

Resource Allocation

Different products may require the same equipment in different ways. Thus, the allocation of equipment must be done in a balanced manner, just as the time in which the equipment is allocated to the product. Each product is associated with a load profile which gives how much the product consumes of each piece of equipment on its route in terms of tons per hour.

This module considers the periods in which the equipment may not be operating, with the consequent repercussion on the available production capacity.

Available-for-Undertaking

The capacity not yet consumed for each week handled by the Master Planner is totaled and accounted week by week by this module. Thus, we have the total available capacity at each period and for each product family. For each order that is accepted, the necessary capacity is decremented from each item of equipment and reflected in the availability of all the product families sharing the machines on the route of each accepted product.

Decision Support System

This module enables the user to interact with the system for introducing, observing and altering data and results supplied by the Master Planner.

Detailed Planner

Even if an order has been entered normally by the Master Planner, nevertheless more thorough planning of the order is necessary when its production period approaches. There are several reasons for this. The orders currently in progress may consume a little more capacity than expected, reducing the capacity available for the entry of new orders. The plant's situation may have changed from the time that the orders were entered. Customers may have requested changes in delivery dates or specification of the previously requested orders. Material in production has been diverted and the order has to be replanned. Lack of sufficient raw material for processing the order.

Figure 10:
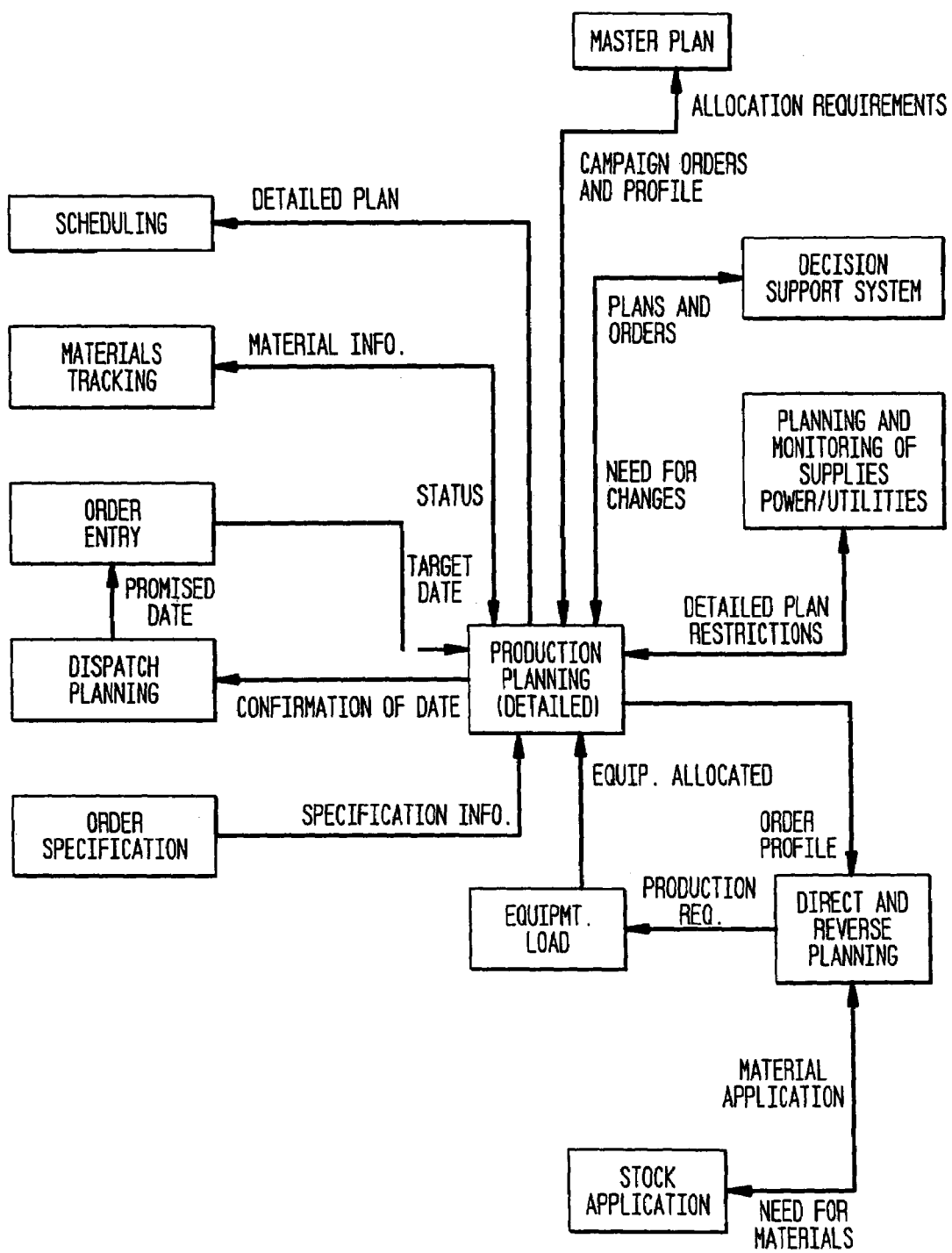
FIG. 10 shows the functional architecture of the Detail Planner of FIG. 9.

Thus, the Detailed Planner, shown in FIG. 10, provides precise monitoring of capacity and replanning of orders, and also uses the available inventory whenever possible. It forecasts the availability of the plant for the orders already in progress and for those not yet begun. The main objectives of the Detailed Planner are:

1. To create detailed order plans by product family.
2. To keep an up-to-date and accurate accounting record of the capacity consumed and available by product family and by equipment.
3. To generate a viable delivery date for new orders falling within the operating horizon of the Detailed Plan.
4. To supply orders to the scheduling system for the requested period.
5. To use inventory availability for planning and replanning orders.

For better use of the plant's capacity, some orders may be brought forward if there is excess capacity. Similarly, in the event of overload, some orders may be delayed and the user may then redefine the plant's available capacity for various product families in order to alleviate the impact of possible delays.

The functions of this module may be used to analyze the consequences of exchanging, altering and replanning orders. Thus, the user can examine the possibilities of speeding up the production of priority orders.

At each step in the production process, the detailed plans furnish the consumption data for each type of material used in production. From this data, the appropriate amount of raw material can be calculated that will be necessary to support production.

The final plans for each product family are published together with the production and inventory requirements. Replanned orders and unexpected capacity bottlenecks are reported.

The functional architecture of the Detailed Planner has the following characteristics:

Production Order Planning

The planning mechanism loads the orders in progress and the new orders starting from the specified week for merging by the Master Planner and those that have their delivery dates delayed will be listed for the user. The production levels of each product line are defined for each item of equipment contained in their routes. This module tries to overcome bottlenecks by using alternative resources, starting order processing earlier, or by delaying some orders. The orders each day, as well as the initial and final inventory levels.

Starting from the delivery date, each stage of production in the order route must be examined to ensure sufficient time for producing the order, given all the production times of each stage. If necessary, the orders can be projected from the week of merging for defining the nearest delivery date.

Equipment Load

This module is similar to that encountered in the Master Plan, but with more details. It considers the time of processing by the equipment, equipment configuration time, line constraints and daily capacities.

Planning and Monitoring of Supplies and Power/Utility

The limiting constraints of supply and power are considered so as to maintain a viable allocation of orders to the plant. Within the valid limits, the Detailed Planner reports the levels of supplies and power that will be necessary for producing orders.

Decision Support System

The user will have to interact with the Detailed Planner to resolve operational exceptions and to assess alternatives for loading resources and replanning. With unforeseen events, it may be impossible to deliver all the orders without there being a delay; the user must intervene and decide which will be delayed and which will not. The impacts of changes in quantity, specification and delivery date of orders also must be analyzed by the user.

Production Scheduling

Figure 11:
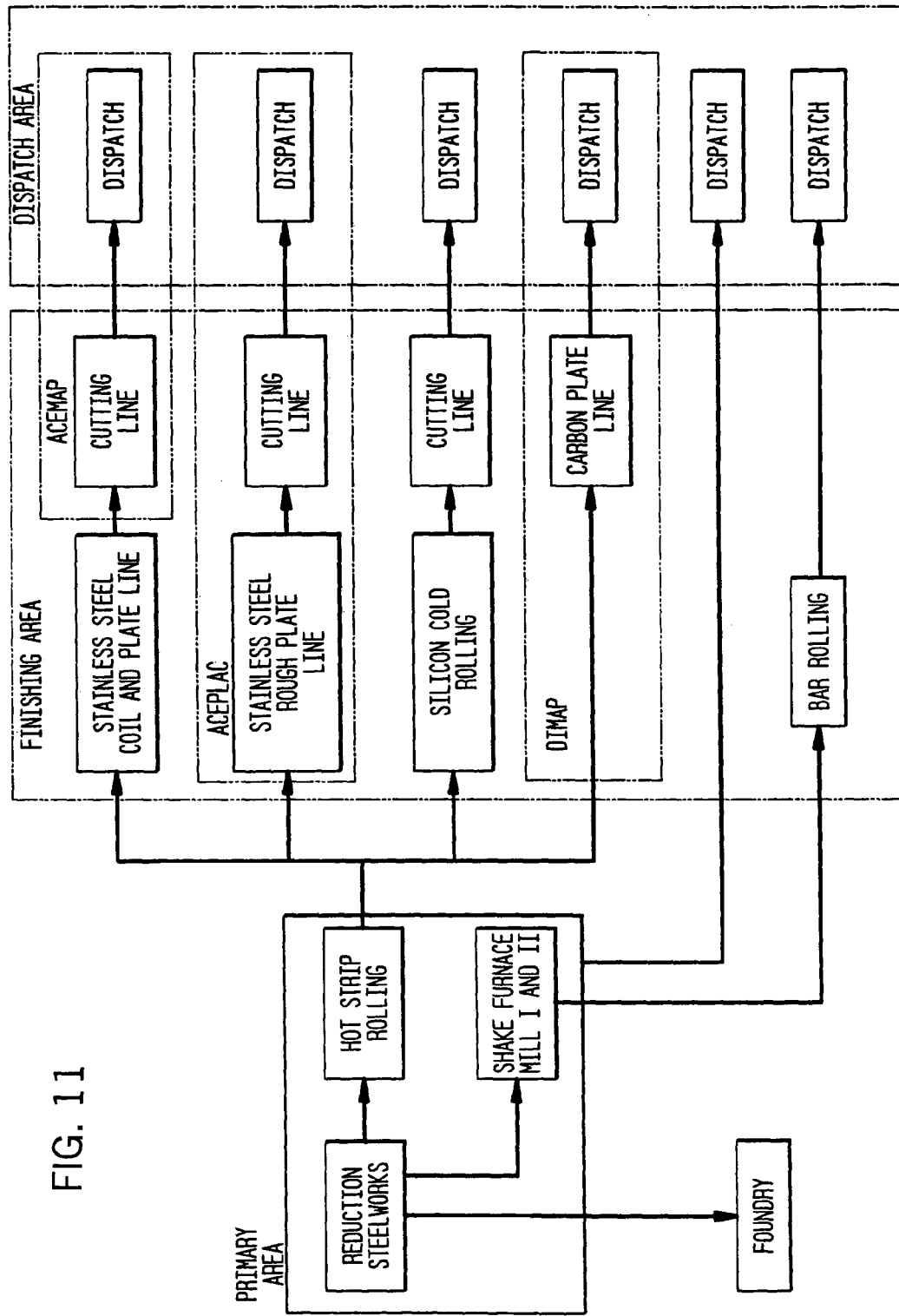
FIG. 11 shows a Production Scheduling system.

The Production Scheduling system, shown in FIG. 11, is composed of four modules: Primary Area Scheduling, Finishing Area Scheduling, Dispatch and Foundry Area Scheduling. FIG. 11 shows these areas and the relationship between them.

Primary Area Scheduling

Figure 12:
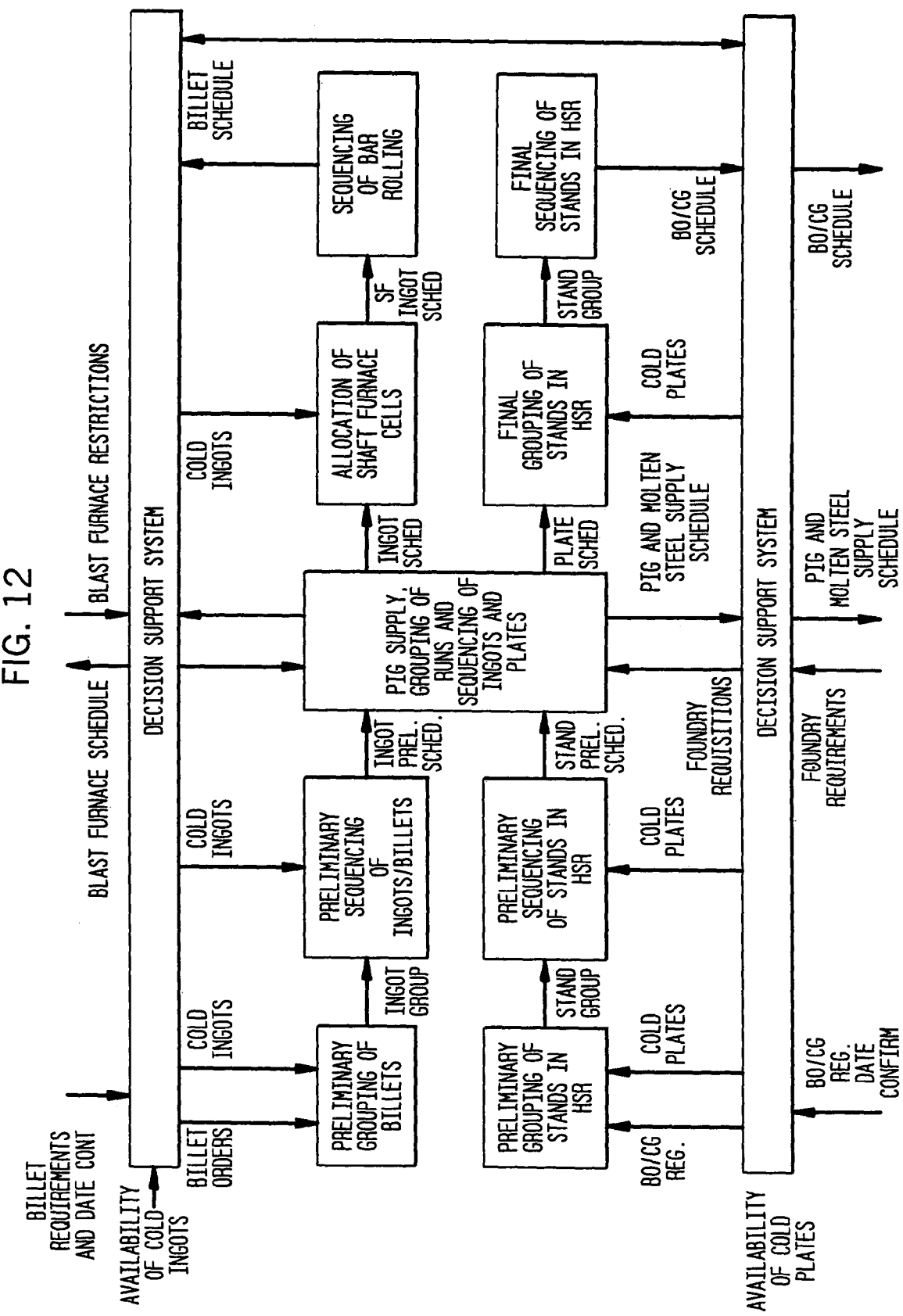
FIG. 12 shows the functional architecture of the Primary Area Scheduling.

The architecture of the Primary Area Scheduling, shown in FIG. 12, is based on the following requirements:

Providing a display of the primary area equipment for the desired scheduling horizon, e.g. a week or several days (from here on we shall regard this horizon as being one week). The solution generated must take into consideration all significant constraints so that the scheduling is as faithful as possible to reality.

Generating a detailed schedule for the equipment, taking into account pig iron supply constraints, constraints in grouping, sequencing and timing of equipment and the supply demands of the Foundry and Finishing Areas.

The architecture of FIG. 12 provides an integrated schedule for all the principal equipment of the primary area.

The scheduling process begins with the selection of orders for a specific week. Orders are grouped together for creating the best billet formation sequence from the point of view of the bar line and the best stand sequence from the point of view of the Hot Rolling Area. To these sequences are added the pig iron supply constraints and the pig iron requisitions made by the Foundry for then generating the scheduling of what is actually viable to be produced by the steelworks. The actual schedules of ingots for the bar line, plates for the Hot Rolling area, limits of supply of pig iron by the Blast Furnaces and steel for the Foundry are considered for the final generation of billet and coil scheduling and for the internal scheduling of the Foundry. The scheduling of the pig iron supply of the Blast Furnaces is generated within the valid limits. Throughout this process, all the relevant constraints will be considered for the maximum suitability of the solution to the situation of the plant at any given moment.

Once a solution is generated, the user may erase and rework any part of the solution. Thus, any possible constraints which are not normally required to be considered may be imposed manually by the user.

A new solution must be generated whenever the proposed scheduling clashes significantly with the plant situation. Examples of events that may require new scheduling are: diversion of material, insertion of new orders, order cancellations and breakdown of equipment.

The functional architecture modules of the Primary Area shown in FIG. 12 are:

Preliminary Grouping of Billets

The bar finishing line orders are grouped according to the similarity of characteristics wanted in the sequencing of the billets, e.g. grade of steel, delivery date and configuration of the bar rollers. After consideration of the cold ingots available in stock, the best grouping of billets is generated. At this point, specific constraints of the steelworks equipment should be disregarded.

Preliminary Sequencing of Billets and Ingots

Given the groupings supplied by the previous module, the best sequence of billets is generated and the corresponding ingot sequence for the bar rollers. One of the basic objectives is the hot charging of ingots whenever possible. Available cold ingots are calculated. Steelworks constraints are still disregarded.

Preliminary Grouping of Stands

All the orders requisitioned by Hot Rolling for the desired scheduling horizon are grouped by the characteristics appropriate to the rolling process: e.g. width and thickness of the plates, delivery date, and type of steel. Plates available in stock must be considered.

Preliminary Sequencing of Stands

Considering the stands formed in the previous module, a sequence of stands is generated, so as to best meet the constraints of plate rolling. Again, available cold plates are considered, but the majority of the constraints relevant to the steelworks are not.

Formation of Runs and Continuous Ingoting and Blast Furnace Sequencing

For each ingot of the sequence requested by Bar Rolling and each plate of the sequence requested by Hot Rolling, the time is determined that the ingot or plate may wait between the end of ingoting and the start of charging for rolling. The ingots and plates are grouped in runs so as to maximize the number of ingots or plates that overlap in the period that they have available to be charged hot. As the runs are formed, they are assigned to the equipment (e.g. BOFs, pot furnaces, degasifier) for ensuring that the continuity of processing of the run within the steelworks is viable. All the constraints of the continuous rolling mill which may involve sequences of several runs are verified, as well as the limitations and impositions of the Blast Furnaces. The demands from the Foundry are accommodated between the runs being created. This module generates the possible scheduling of being supplied by the steelworks for the ingots, plates, Foundry servicing and distribution and pig iron of the Blast Furnaces as near as possible to what is demanded at the steelworks.

Allocation of Shaft Furnaces

Given the actual sequence of ingots to be produced by the steelworks, this module must select the cells of the shaft furnaces available and assign them the ingots, making all the necessary time allowances, as well as considering the reheating of the available cold ingots.

Sequencing of the Bar Rollers

Once the sequence is given with which the ingots are available to the shaft furnaces, the sequence with which they must be rolled is determined, taking into account the timing and configuration constraints of the rollers.

Final Grouping of Stands

Given the final sequence of plates to be produced by the steelworks, the time available for hot rolling each of them is calculated. By maximizing the number of plates with overlapping of these times, the plates are grouped in stands, achieving homogeneity in width, thickness, delivery date and type of steel of the plates. The available cold plates are also considered. All the constraints of forming the stands must be satisfied.

Final Sequencing of Stands

Once the stands are defined, the constraints imposed by the hot rolling area and the nearest order delivery date within each stand are considered, generating the final scheduling of the stands and consequently of the hot coils and rough plates.

Decision Support System

The user may review the solutions generated and alter them. If the modifications violate any constraint, the user will be notified, but it is his decision whether or not to keep the modification.

Finishing Area Scheduling

Figure 13:
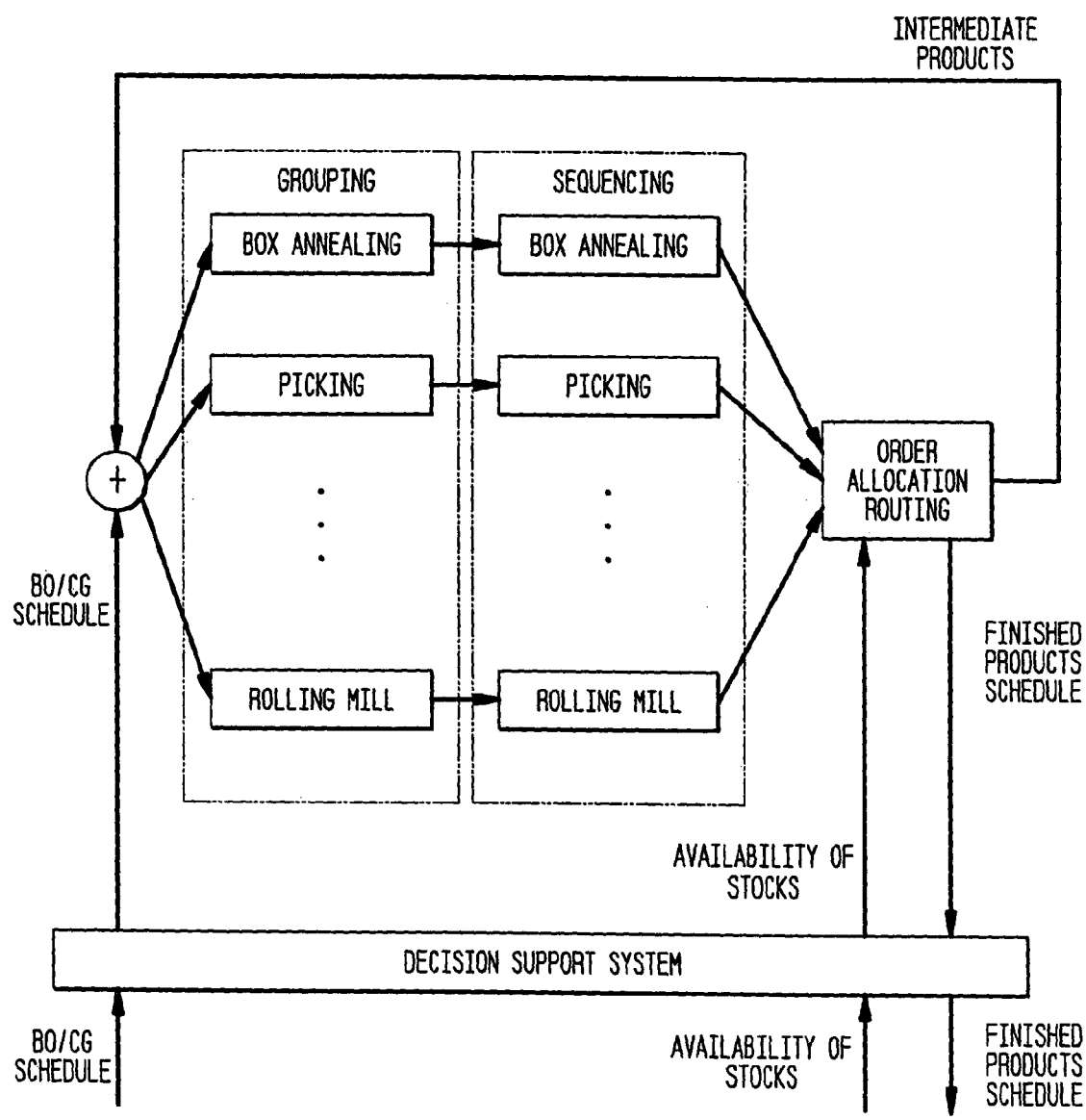
FIG. 13 shows the functional architecture of the Finishing Area.

FIG. 13 shows the functional architecture of a finishing area. The finishing area shown in this Figure consists of the Stainless Steel Coil and Plate Finishing Lines, the Silicon Finishing Line, their respective Cutting Lines, the Carbon Cutting Line and the Bar Rolling Mill.

The proposed architecture for the Finishing Area is based on the following points:

generation of a schedule for the Finishing Area equipment for a certain horizon (e.g. a week), taking into account all the constraints of this equipment.

minimizing the configuration times of the equipment and order delays.

The orders supplied by the Primary Area are grouped together and sequenced for a week. All maintenance periods must be taken into account. Inventory Application has an important role in the use of material in progress which is diverted.

A description follows of the approaches to be used for scheduling each of the finishing lines.

Stainless and Silicon Steel Lines

These two finishing lines have very similar characteristics with regard to the operating procedures of production: all the equipment in these lines, as a rule, passes through two operating stages. The first is a grouping of orders meeting the operating constraints of the equipment, e.g. all the coils in a group must belong to the same type of steel. The second stage is that of sequencing, in which the coils of a group are sequenced, e.g. the coils must be in order of decreasing length. At the end of a sequencing stage, the coils are released to the next equipment on their route, being made available to be processed.

The sets of coils that are grouped together in a particular machine and have the same route are still not allocated to one order, but to a set of orders, i.e. the allocation of metal units to orders is done as late as possible, so as to benefit from the possibility of selecting which order should be treated as diverted and which should continue forward when a diversion occurs. At the start of each system operation, the function of refining order allocation creates the initial groups of orders for each of the items of equipment.

The grouping, sequencing and order allocation refinement cycle is repeated until all the orders have been processed by all the equipment on their routes. The Decision Support System enables the observation of the results and the intervention of the user at all levels of decision taken (i.e. valid for the remaining lines of the Finishing Area).

Bar Rolling

Figure 14:
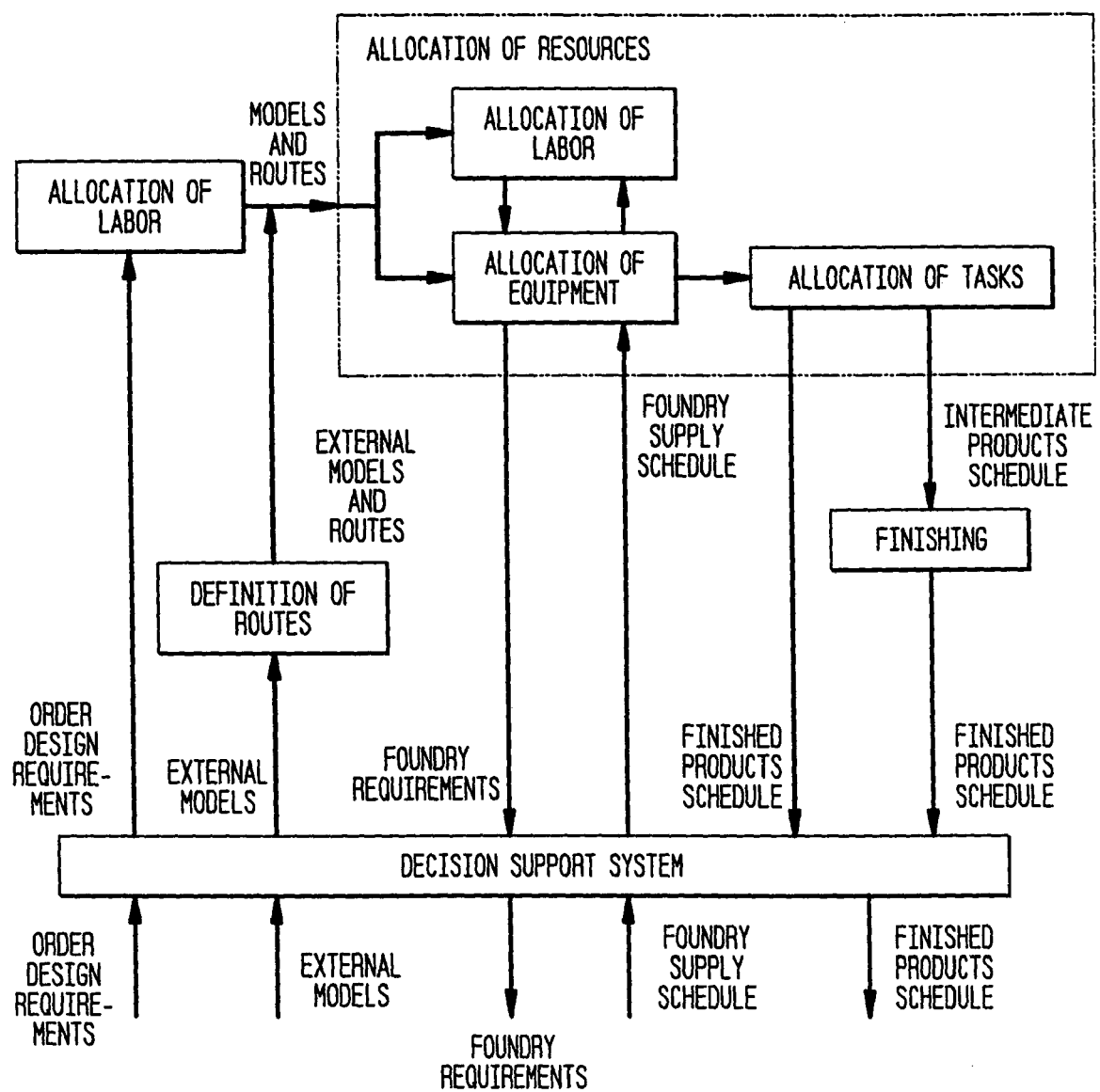
FIG. 14 shows the functional architecture of the Foundry Scheduling.

The scheduling of billets (rough bars) originating from the rollers (MILL 1 and 2) is taken into account so that suitable groups of material are formed and sequenced by the equipment of the Bar Line Finishing Area. The approach to the solution of this type of problem may be regarded as a special case of the approach described for Stainless/Silicon steel, since the equipment has similar grouping and sequencing characteristics. Both the scheduling of billets and that of finished products can be altered and adjusted by the Decision Support System Foundry FIG. 14 shows the functional architecture of the Foundry Scheduling. This is an area that operates separately from the rest of the plant, except for requisitions for steel from the Steelworks and pig iron from the Blast Furnaces.

The first step in the process of casting is the allocation of human resources to the planning phase of a new order, in which the models and production routes are generated for the equipment. External models may also be acquired and their routes determined.

Owing to the existence of more equipment than manpower to operate it, human resources become critical in the Foundry. Accordingly, a careful check is made to simultaneously allocate a human resource to an item of equipment so as to carry out each task specified in the routing of an order.

The final production phase of an order may involve a finishing stage, when we then have the scheduling of the finished products. Again, both the data supplied to the Foundry and that generated by it may be modified by the user via the Decision Support System.

Dispatch Scheduling

Figure 15:
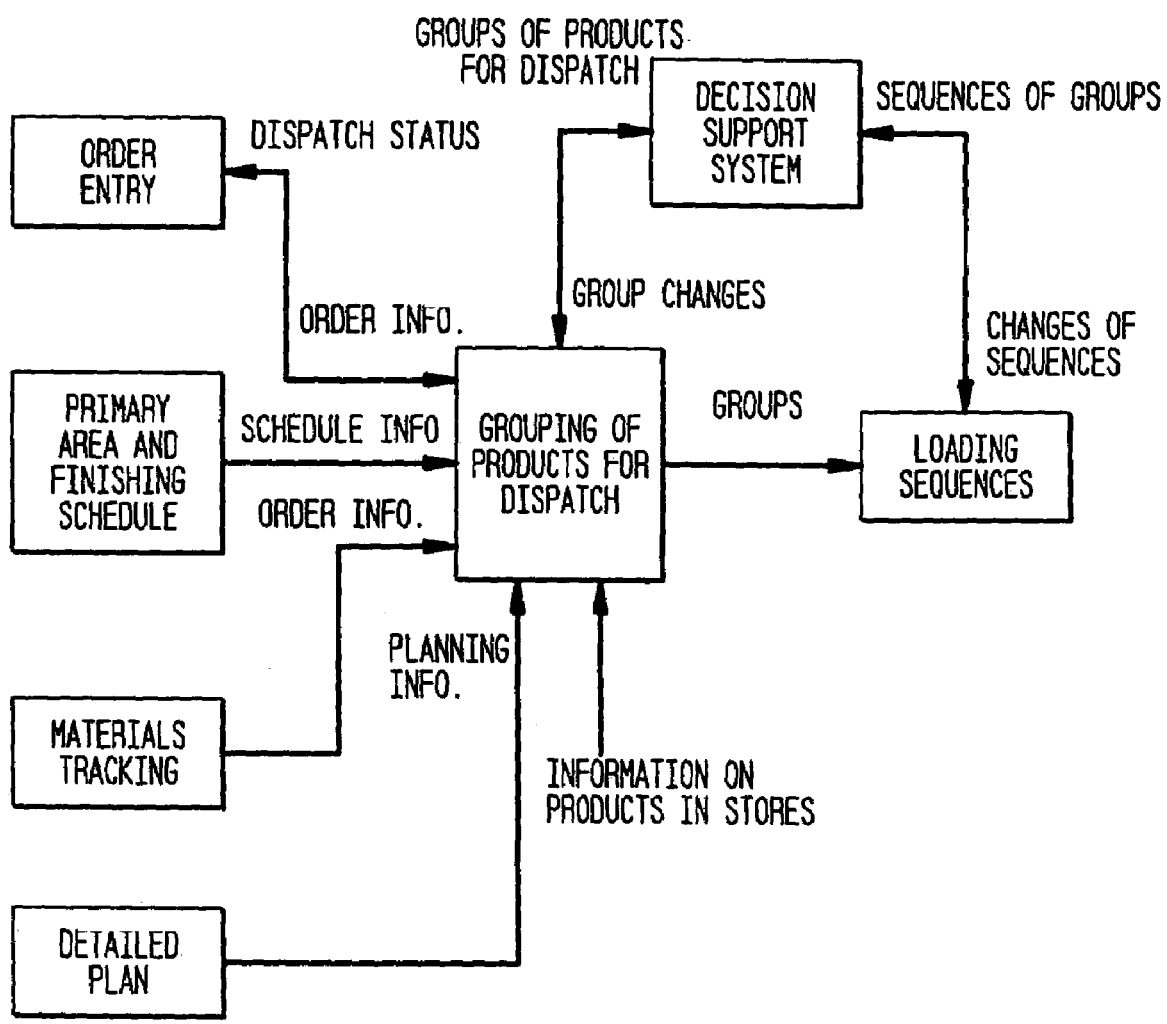
FIG. 15 shows the functional architecture of Dispatch Scheduling.

FIG. 15 shows a functional architecture of Dispatch Scheduling. The transport function completes the production process of an order in the plant. This function must generate a schedule that minimizes delay in delivery and suitably explores transport alternatives. The architecture of FIG. 15 is based on the following basic points:

Generating a schedule for a week (or any desired period) for each means of transport (lorry, train, ship, etc.) taking into account the scheduling of the finished products produced by the plant.

Adjusting the daily scheduling whenever necessary.

Developing a load schedule based on the haulage companies' scheduling.

Generating new scheduling when any serious distortion occurs in the availability of products or of the means of transport.

Generating a schedule that minimizes delivery delay and transport cost.

Enabling monitoring of the performance of the haulage companies.

Shipment Grouping

This function receives the scheduling of the finished products and groups them together with those found in a shipping depot. These groups will be dispatched by the various haulage companies. This module minimizes delivery delay and the cost of transport.

Load Sequencing

The grouped orders are sequenced to form a load schedule based on the haulage companies' scheduling. Constraints such as availability of space for handling the load and haulage capacity must be taken into account.

Decision Support System

The user must have a clear view of the orders that are to arrive from the plant and of those in the shipping depots. Moreover, the user must be able to correct and alter any data considered or generated by the Dispatch Scheduling module. This function also monitors the level of deviation between what is scheduled and what is carried out, generating the necessary information for when new scheduling is wanted.

Technical Specification and Routing of Orders

Figure 16:
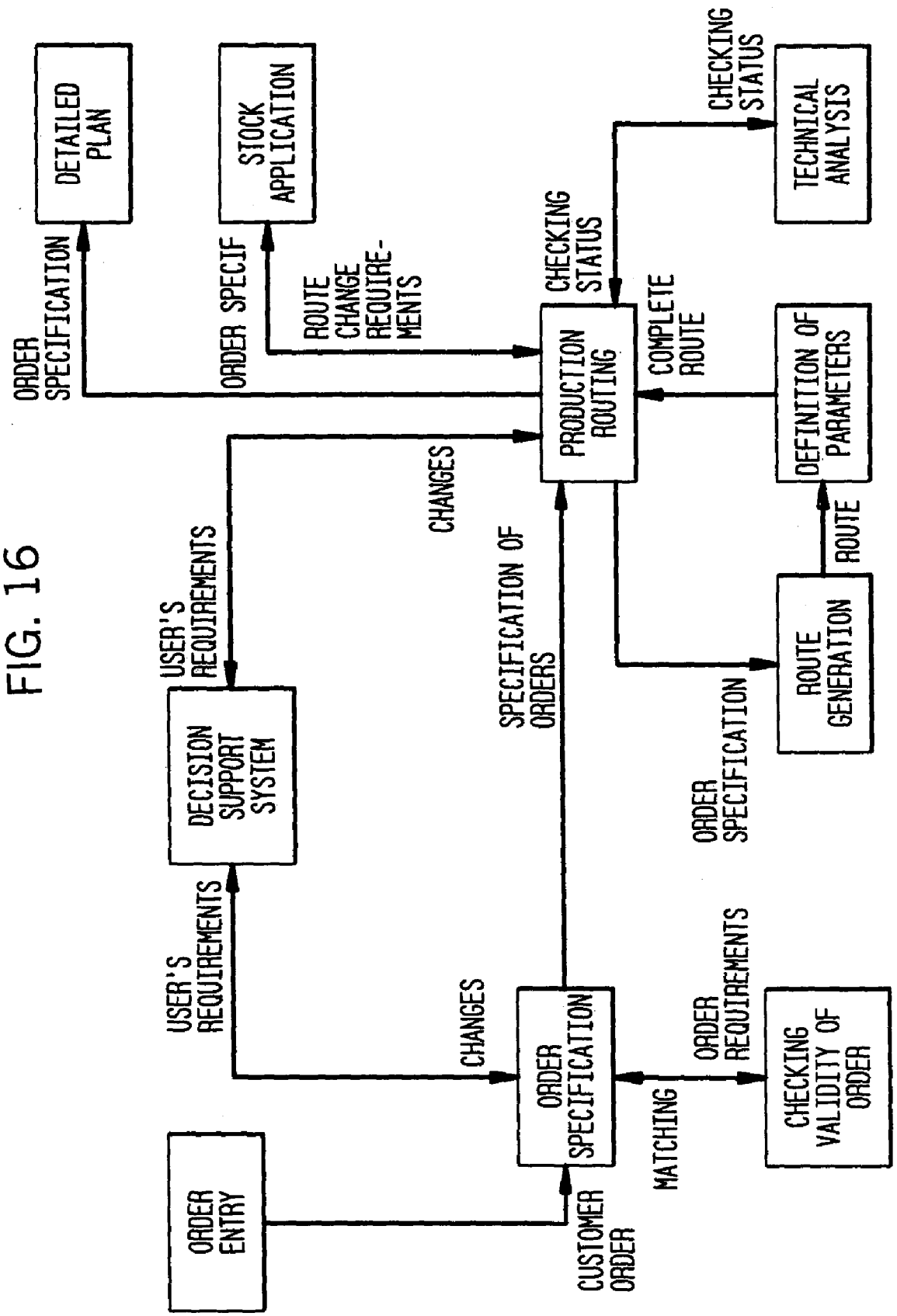
FIG. 16 shows the functional architecture of Order Specification and Routing.

On entering an order, it must be quickly and dynamically specified. The order specification and routing architecture of FIG. 16 (FIG. 11) is based on the following points:

Reducing or eliminating manual specification and routing through the maintenance and updating of metallurgical knowledge and specification of orders.

Dynamically specifying orders with routing information, as soon as the orders are placed by the customers.

Keeping the orders in a repository equally accessible by Planning and Scheduling.

Providing a viability check for the specification of orders and automatically re-routing the orders whenever necessary.

The order specification process begins with access to the customer orders supplied by the order entry function. Customer requests are translated into the user's internal nomenclature.

According to the type of product specified, the grade of steel, the width, the length and the quality, the routing is generated to reflect the load demands of the order on the equipment of the route. The routing must include information on the sequence of equipment on which the order needs to be processed, processing times on each item of equipment, production rates, and intermediate dimensions at each stage.

The viability of producing the order as specified is checked against the capacities of the equipment to ensure that the order can be physically processed as specified. If the check fails, an alternative route, if it exists, must be automatically generated.

All the orders specified are evaluated with cost information based on their route. These orders are equally accessible by Planning and Scheduling.

Specification of Orders

This function translates the information from the customer order to the user's internal order standard. International technical standards are used and pre-defined information is supplied in cases where some characteristics of the order are not provided by the customer.

Checking the Validity of the Order

This function is performed for each order placed. If the order cannot be processed, this information is passed on to the Decision Support System function, which must provide the means for requests to be altered if possible.

Route Generation

Once an order passes the production viability check, its standard production route must be generated. Information on the order, customer preference and rolling mill conditions are taken into account.

Alternative Route Generation

If a route cannot be found, a request for re-routing must be sent to this function which, in its turn, will attempt to discover an alternative route.

Cost Generation

This function calculates the cost of an order based on the routing associated with it.

Decision Support System

The user can observe the information supplied and generated by the Specification and Routing module and modify it as he considers necessary.

Inventory Application

Figure 17:
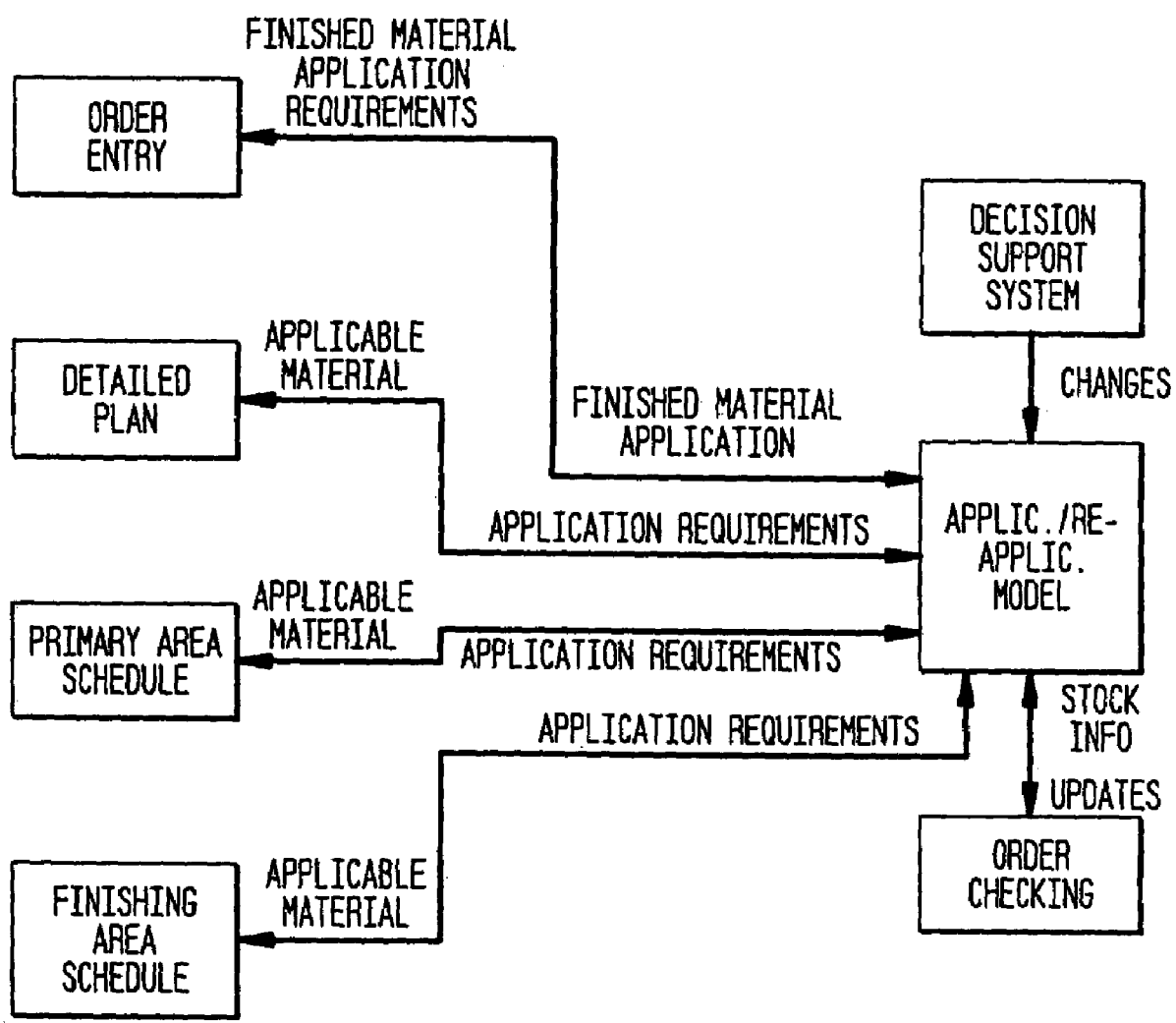
FIG. 17 shows the functional architecture of Inventory Application.

The Inventory application process, shown in FIG. 17, matches the relevant attributes of the available material to the specifications of the orders and determines the eligibility of the material for a given order. The material may be plates, partially finished coils or finished products. Business rules are used to judge the suitability of the allocation between the available material and the order, both when there are several materials for one order and when there are several possible orders for a particular material. Inventory Application to an order will cause an impact upon the Detailed Planner and Scheduling.

The Inventory Application process begins with the analysis of new orders to determine which can be assigned to the existing inventory of plates and coils. Some characteristics that may be considered are: chemical properties, quality, width, thickness and weight.

When multiple candidates are available, the best choice is identified according to a predefined preference list. Once a plate or coil has been applied to an order, it will no longer be available for other applications. The user may intervene whenever necessary.

Allocation/Re-Allocation of Orders

Order data and inventory data are processed by this function. Specific attributes of orders, plates and coils can be compared. The matching criteria, order attributes and the candidate plates or coils are examined. The viability of the match between the order and the material is determined.

Predefined rules are used for prioritizing in the event of multiple matching possibilities.

Decision Support System

This function has to support the intervention of the user in the decision process on the suitability and availability of candidate material to be allocated to an order.

Benefits

The described functional architecture will bring a series of benefits. Some of them are found below:

Optimization of the profit margin and resources of the company from the Year Planner to the plant's Production Scheduling.

Weighted balance between market demands and the plant's production potential.

Rapid and precise response to viability of meeting customer requests.

The expected date of delivery will be determined promptly, taking into account all the intermediate stages of production. Inventory information will be taken into account in the arrival of new orders and in the reallocation of diverted orders.

The automation of the Planning and Scheduling Systems will enable users to concentrate on tasks which are more critical and strategic to the company.

The Production Scheduling of the whole plant will be fully integrated, from the Steelworks to the end of the Finishing Lines.

Planning will automatically generate the formation and sequencing of campaigns.

The Specification and Routing System will be sufficiently intelligent to release people from tedious manual processes. The specification process will consider standard and alternative routes.

Application of material will be considered on entering orders. The process will be automatic and performed in real time. All the relevant aspects of matching orders with available materials will be considered.

The total time between the placing of the order and its being shipped to the customer will be reduced.

Planning and Scheduling will be continually adapted to the plant's conditions in order to exploit its capacities to the maximum and better service the market.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A computer implemented method for allocating finished units in a production facility to orders received from customers for those units, the computer implemented method comprising the steps:

identifying, via one or more computers, orders from customers for finished units;

identifying, via said one or more computers, finished units in production at a defined time and available to fill said orders;

identifying, via said one or more computers, defects in the finished units and defects that the customers are willing to accept;

of said identified finished units, identifying, via said one or more computers, valid units that are available to be assigned to said orders;

for each of the finished units, creating, via said one or more computers, an associated surface defect map indicating the locations of defects in said each finished unit and characteristics of said defects;

using, via said one or more computers, said defect maps to search for the largest area in each of the finished units that can be assigned to each order;

iteratively assigning and unassigning, via said one or more computers, valid units to said orders, in a defined sequence of said orders, until either (i) all the orders are fulfilled, or (ii) there are no more assignment options to be tested, including;

identifying, via said one or more computers, any incomplete orders, and for each identified incomplete order, searching among valid units previously assigned to other orders for a unit that fulfills said identified incomplete order, and if a unit, previously assigned to some other order, is found that fulfills said identified incomplete order, then, via said one or more computers,
(i) unassigning said found unit from said other order, and (2) re-assigning said found unit to said identified incomplete order.

2. A computer implemented method according to claim 1, wherein:
the step of identifying finished units and orders includes the step of identifying incomplete orders and a due date for each of the incomplete orders;
the step of iteratively assigning and unassigning valid units includes the step of, starting with the incomplete order having the earliest due date, searching among the available valid units for a unit that fulfills said incomplete order.

3. A system for allocating finished units in a production facility to orders received from customers for those units, the system comprising:
means for identifying orders from customers for finished units;
means for identifying finished units in production at a defined time and available to fill said orders;
means for identifying defects in the finished units and defects that the customers are willing to accept;
means for creating, for each of the finished units, an associated surface defect map indicating the locations of defects in said each finished unit and characteristics of said defects;
means for using said defect maps to search for the largest area in each of the finished units that can be assigned to each order;
means to identify which ones of said identified units are valid units that are available to be assigned to said orders; and to iteratively assign and unassign valid units to said orders, in a defined sequence of said orders, until either (i) all the orders are fulfilled, or (ii) there are no more assignment options to be tested, including
identifying any incomplete orders, and for each identified incomplete order, searching among valid units previously assigned to other orders for a unit that fUlfills said identified incomplete order, and if a unit, previously assigned to some other order, is found that fulfills said identified incomplete order, then (i) unassigning said found unit from said other order and (2) re-assigning said found unit to said identified incomplete order.

4. system according to claim 3, wherein:
the means for identifying finished units and orders includes means for identifying incomplete orders and a due date for each of the incomplete orders; and
the means for iteratively assigning and unassigning valid units includes means for searching among the available valid units for a unit that fulfills the one of the incomplete orders having the earliest due date.

5. A program storage device readable by machine, tangibly embodying a program of instructions executable by the machine to perform method steps for allocating finished units in a production facility to orders received, said method steps comprising:
identifying orders from customers for finished units;
identifying finished units in production at a defined time and available to fill said orders;
identifying defects in the finished units and defects that the customers are willing to accept;
of said identified finished units, identifying valid units that are available to be assigned to said orders;
for each of the finished units, creating an associated surface defect map indicating the locations of defects in said each finished unit and characteristics of said defects;
using said defect maps to search for the largest area in each of the finished units that can be assigned to each order;
iteratively assigning and unassigning valid units to orders, in a defined sequence of said orders, until either (i) all the orders are fulfilled, or (ii) there are no more assignment options to be tested, including
identifying any incomplete orders, and for each identified incomplete order, searching among valid units previously assigned to other orders for a unit that fulfills said identified incomplete order, and
if a unit, previously assigned to some other order, is found that fulfills said identified incomplete order, then (i) unassigning said found unit from said other order and (2) re-assigning said found unit to said identified incomplete order.

6. A program storage device according to claim 5, wherein:
the step of identifying finished units and orders includes the step of identifying incomplete orders and a due date for each of the incomplete orders;
the step of iteratively assigning and unassigning valid units includes the step of, starting with the incomplete order having the earliest due date, searching among the available valid units for a unit that fulfills said incomplete order.

7. A computer implemented method according to claim 1, wherein:
the finished units are metallic units; and
further comprising the step of identifying, for each of a group of the orders, the largest area of each of a set of the identified metallic units that can be assigned to the order.

8. Apparatus according to claim 3, wherein:
the finished units are metallic units; and
further comprising means for identifying, for each of a group of the orders, the largest area of each of a set of the identified metallic units that can be assigned to the order.

9. A program storage device according to claim 5, wherein:
the finished units are metallic units; and
the method steps further comprise the step of identifying, for each of a group of the orders, the largest area of each of a set of the identified metallic units that can be assigned to the order.

10. A computer implemented method according to claim 1, wherein:
the orders have delivery dates; and
the step of iteratively assigning and unassigning valid units includes the step of taking the delivery dates into consideration when iteratively assigning and unassigning valid dates.

11. A computer implemented method according to claim 1, wherein:
the finished units are metallic coils; and
the step of iteratively assigning and unassigning valid units includes the step of allocating each of the orders to precise regions of the coils so that the minimum quality of each order is not violated while minimizing waste of material.

12. A computer implemented method according to claim 1, wherein:
the finished units are metallic coils; and
the step of using said defect maps include the step of, for each of said orders, using the surface defect maps to identify precise regions of the coils that will satisfy said each order.

* * * * *